No. 854,929. PATENTED MAY 28, 1907.
W. A. COOK.
HAY DROPPER.
APPLICATION FILED JAN. 24, 1906.
3 SHEETS—SHEET 1.
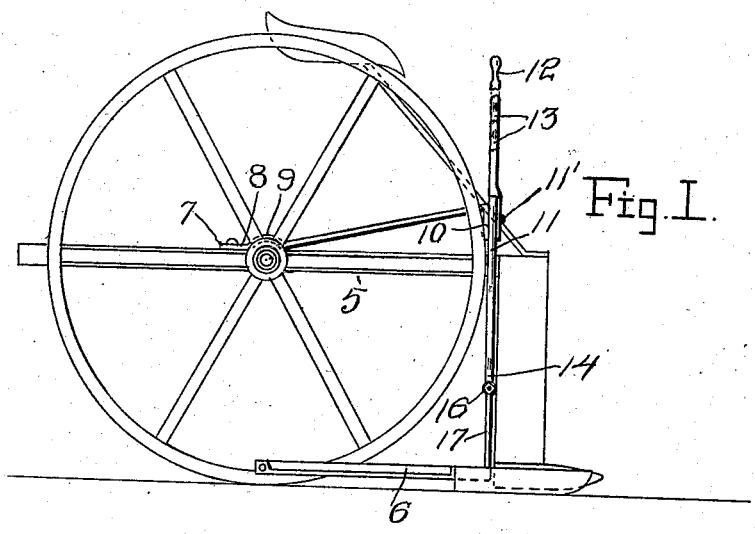
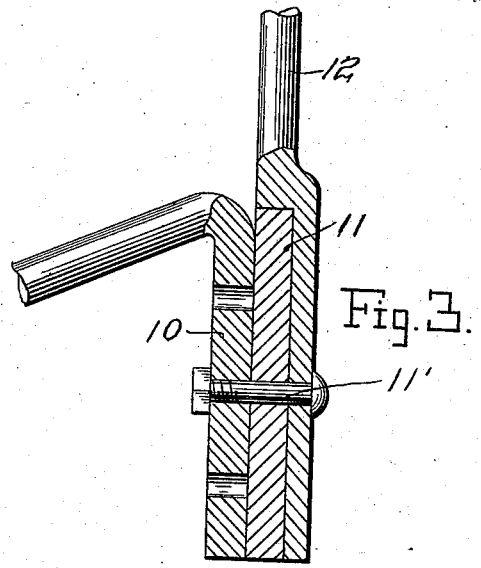
Witnesses
O. K. Reichenbach.
J. C. Jones.
Inventor
W. A. Cook.
By
Attorneys.

No. 854,929. PATENTED MAY 28, 1907.
W. A. COOK.
HAY DROPPER.
APPLICATION FILED JAN. 24, 1906.
3 SHEETS—SHEET 2.
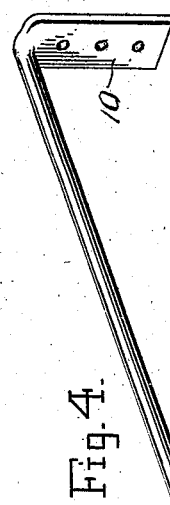
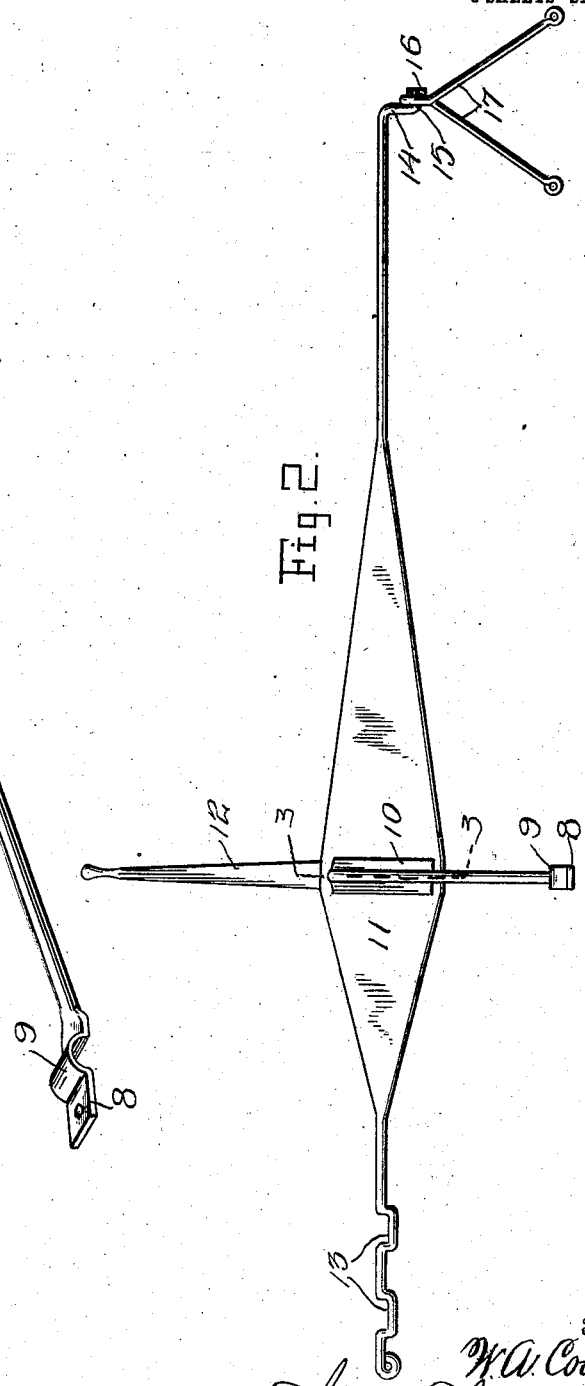
Witnesses
Inventor
W. A. Cook
By
Attorneys

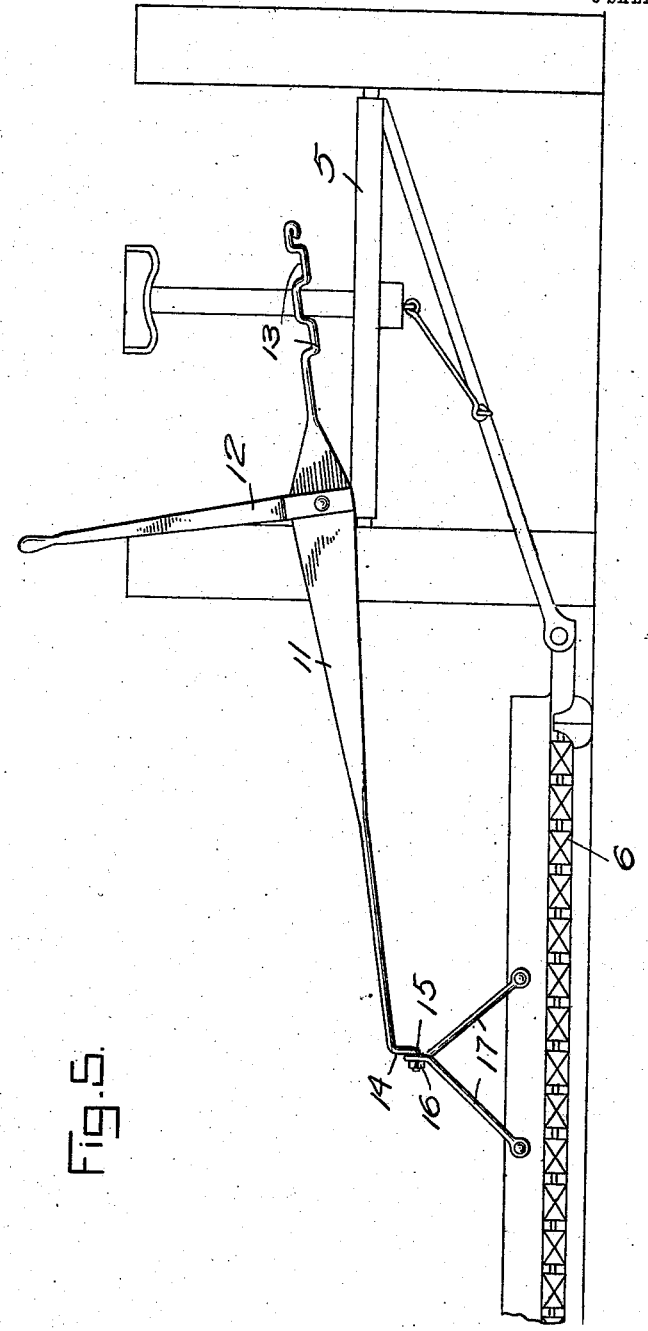

UNITED STATES PATENT OFFICE.

WILLIS A. COOK, OF STURGIS, SOUTH DAKOTA.

HAY-DROPPER.

No. 854,929.     Specification of Letters Patent.     Patented May 28, 1907.

Application filed January 24, 1906. Serial No. 297,715.

*To all whom it may concern:*

Be it known that I, WILLIS A. COOK, a citizen of the United States, residing at Sturgis, in the county of Meade, State of South Dakota, have invented certain new and useful Improvements in Hay-Droppers; and I do hereby declare the following to be a full, clear, and exact description of the invention, such as will enable others skilled in the art to which it appertains to make and use the same This invention relates to attachments for mowing machines and more particularly to that class of attachments designed for the purpose of tilting the carrier of the machine to drop the hay therefrom.

The objects of the invention are to provide a device of this character which may be either operated by hand or foot and which may be adjusted to suit various persons.

In the accompanying drawings: Figure 1 is an elevation of a mowing machine showing my invention applied thereto. Fig. 2 is a detail elevation of the invention removed from the mower. Fig. 3 is a detail transverse sectional view on the line 3—3 of Fig. 2, and, Fig. 4 is a detail view of the standard supporting the device. Fig. 5 is a front elevation of a mowing machine showing the application of my invention thereto.

Referring to the drawings, the numeral 5 denotes the frame of a mowing machine and 6 the carrier of the same. Secured to one of the sills of the frame 5 as at 7 is the foot of a standard 8, the said standard being bent up as at 9 adjacent its foot to extend over the axle of the machine. From this point the standard 8 extends upwardly at an angle and has its upper end turned downwardly in a vertical plane and broadened as shown at 10, the said broadened portion being provided with a vertical series of openings for a purpose to be hereinafter described.

A bar 11 is enlarged adjacent one of its ends and is bolted or otherwise secured as at 11' to an operating lever 12, the said bolt 11' being arranged for engagement interchangeably with different openings in the downturned portion 10 of the standard 8, thereby adjusting the position of the said bar 11 with respect to the frame 5 of the machine and serving as a pivot on which said bar 11 rocks. The end of the bar 11 adjacent which the enlarged portion of the said bar is located is provided with a pair of foot rests 13 by means of which and the lever 12, the said bar 11 may be rocked. The opposite end of the bar 11 is turned downwardly as at 14 and thence grainwardly as at 15, the portion 15 being screw-threaded to receive a nut 16, and being engaged through an eye in a hanger 17, the said hanger including diverging arms which are connected to the carrier 6 and serve to raise the same when the said bar 11 is rocked.

What is claimed is:

The combination with a mowing machine including a carrier, of a lever having an enlarged recessed lower end, a rocking bar received intermediate its ends in the recess, a supporting arm having a downturned portion provided with a plurality of bolt holes and disposed against the rocking bar at its point of connection with the lever, and a bolt engaged through the enlarged recessed portion of the lever, the rocking bar, and interchangeably through the openings in the supporting arm, the said rocking bar being connected at one of its ends with the carrier and being provided at its other end with foot rests, substantially as described.

In testimony whereof, I affix my signature, in presence of two witnesses.

WILLIS A. COOK.

Witnesses:
  MATT FLAVIN,
  FRANK SMITH.